United States Patent [19]

Pillsbury et al.

[11] Patent Number: 5,172,628
[45] Date of Patent: Dec. 22, 1992

[54] ROTARY FOOD COOKING DEVICE FOR A GRILL

[76] Inventors: Thomas J. Pillsbury, P.O. Box 6610, Saginaw, Mich. 48608; Keith W. Wurst, 9683 Crescent Beach Rd., Pigeon, Mich. 48755

[21] Appl. No.: 709,351

[22] Filed: Jun. 3, 1991

[51] Int. Cl.⁵ .......................... A23C 3/00; A47J 37/04
[52] U.S. Cl. .................... 99/421 H; 99/419; 99/421 A
[58] Field of Search ............... 99/419, 420, 421 R, 99/421 H, 421 HH, 421 HV, 421 M, 421 V, 421 P, 421 PT, 450, 482, 449; 126/25 R, 9 R, 30, 9 A

[56] References Cited

U.S. PATENT DOCUMENTS

| | | | |
|---|---|---|---|
| 2,130,259 | 9/1938 | Bonaguidi | 99/421 HH |
| 2,485,890 | 10/1949 | Keljik | 99/421 HV |
| 2,577,963 | 12/1951 | Hagopian | 99/421 HH |
| 2,965,097 | 12/1960 | Clark, Jr. | 126/30 |
| 3,331,308 | 7/1967 | Hoffert | 99/421 H |
| 3,848,523 | 11/1974 | Galisz et al. | 99/421 H |
| 3,858,495 | 1/1975 | Gotwalt | 99/421 A |
| 3,866,527 | 2/1975 | Katris | 99/421 H |
| 4,154,154 | 5/1979 | Vivian | 99/419 |
| 4,158,991 | 6/1979 | Nakashima | 99/421 H |
| 5,001,971 | 3/1991 | Beller | 99/421 R |

FOREIGN PATENT DOCUMENTS

| | | | |
|---|---|---|---|
| 2146855 | 3/1973 | Fed. Rep. of Germany | 99/421 HH |
| 6501636 | 10/1965 | Netherlands | 99/421 HH |

Primary Examiner—Timothy F. Simone
Attorney, Agent, or Firm—John J. Swartz

[57] ABSTRACT

Apparatus for cooking food atop a barbeque grill or the like including a hollow rectangular frame having front and rear walls coupled by adjustable side walls to adapt the unit to different size barbeque grills. A plurality of food receiving skewer blades are rotatably mounted on the front and rear walls and include a pointed end for piercing food and a handle end which can be gripped for removing the skewer blades. One of the skewer blades is rotatably driven via a motor mounted thereon adjacent the front wall. The rotation of the driven skewer blade is coupled to the remaining skewer blades via intermeshing gears rotatably mounted on the rear wall.

15 Claims, 4 Drawing Sheets

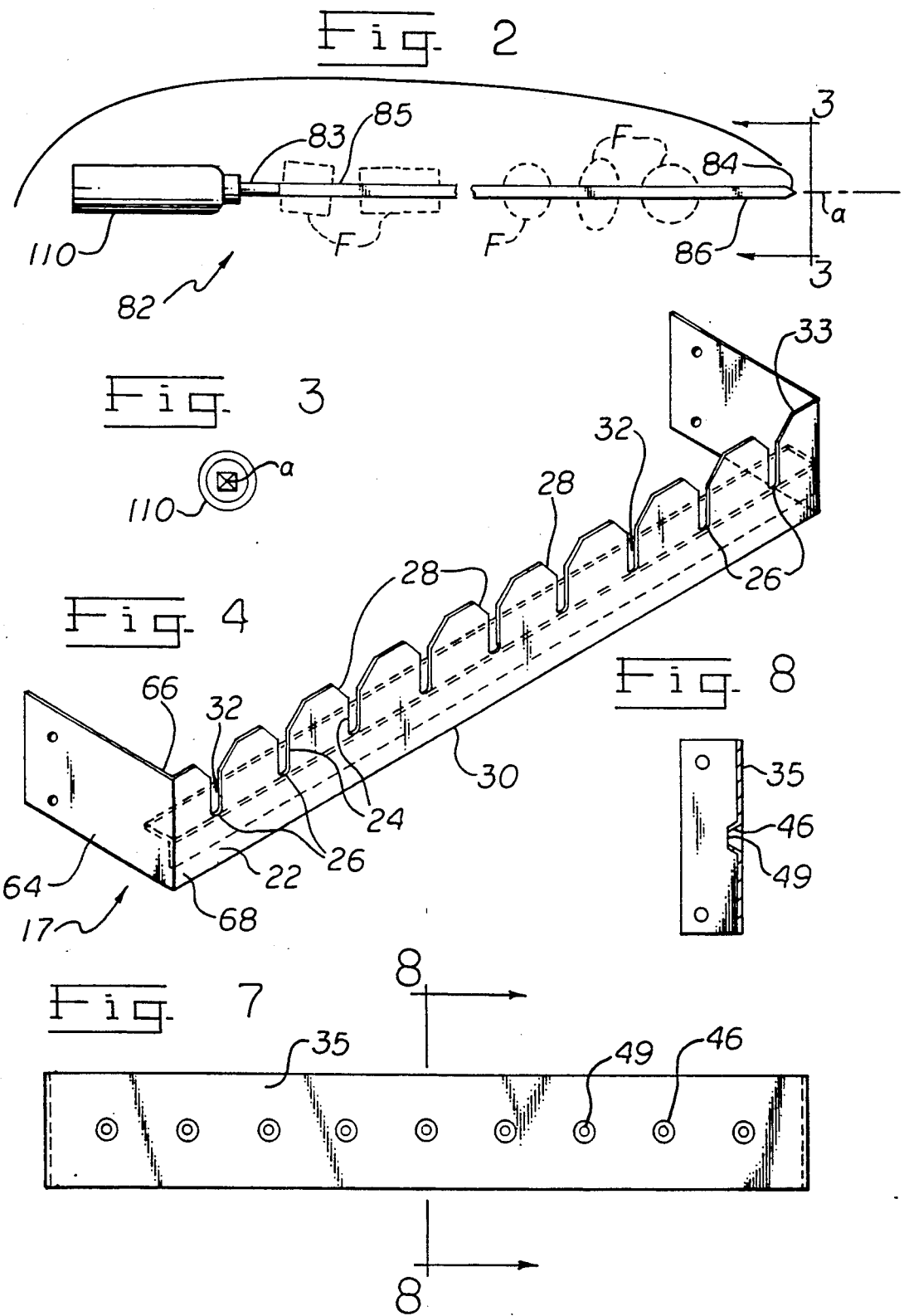

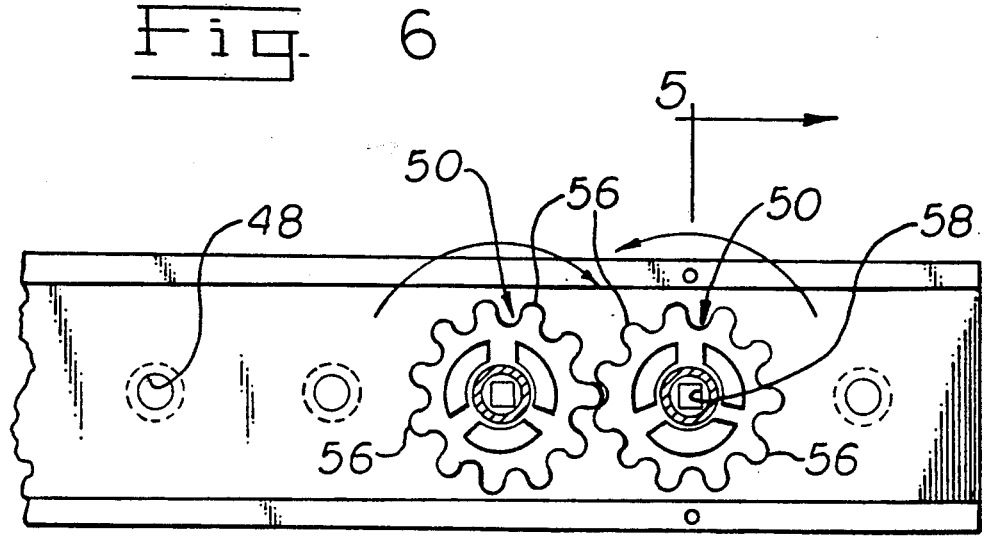
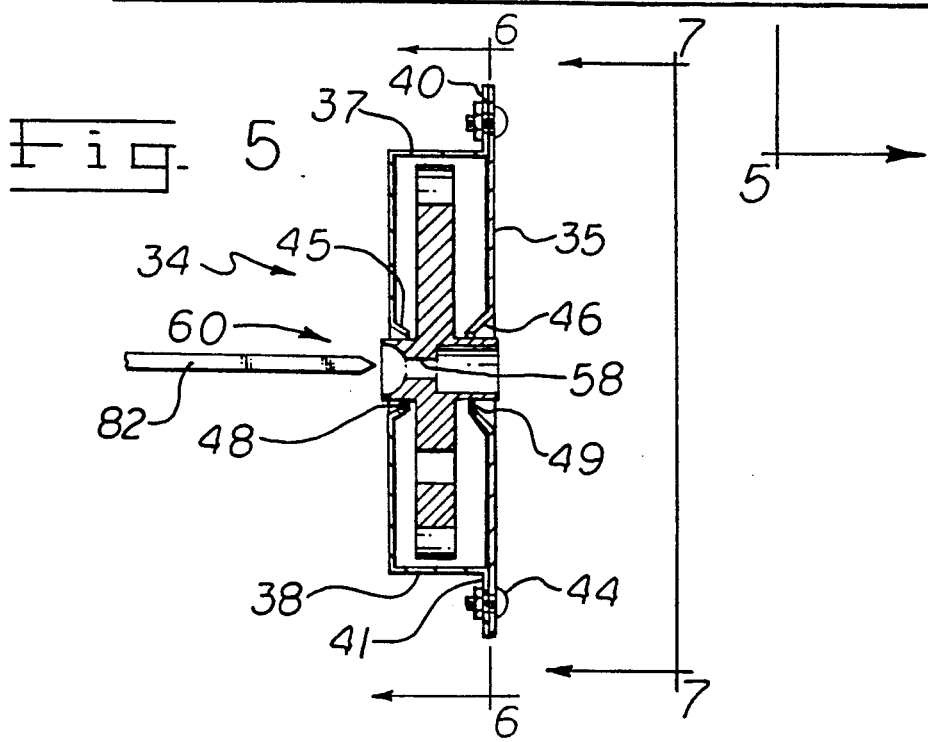

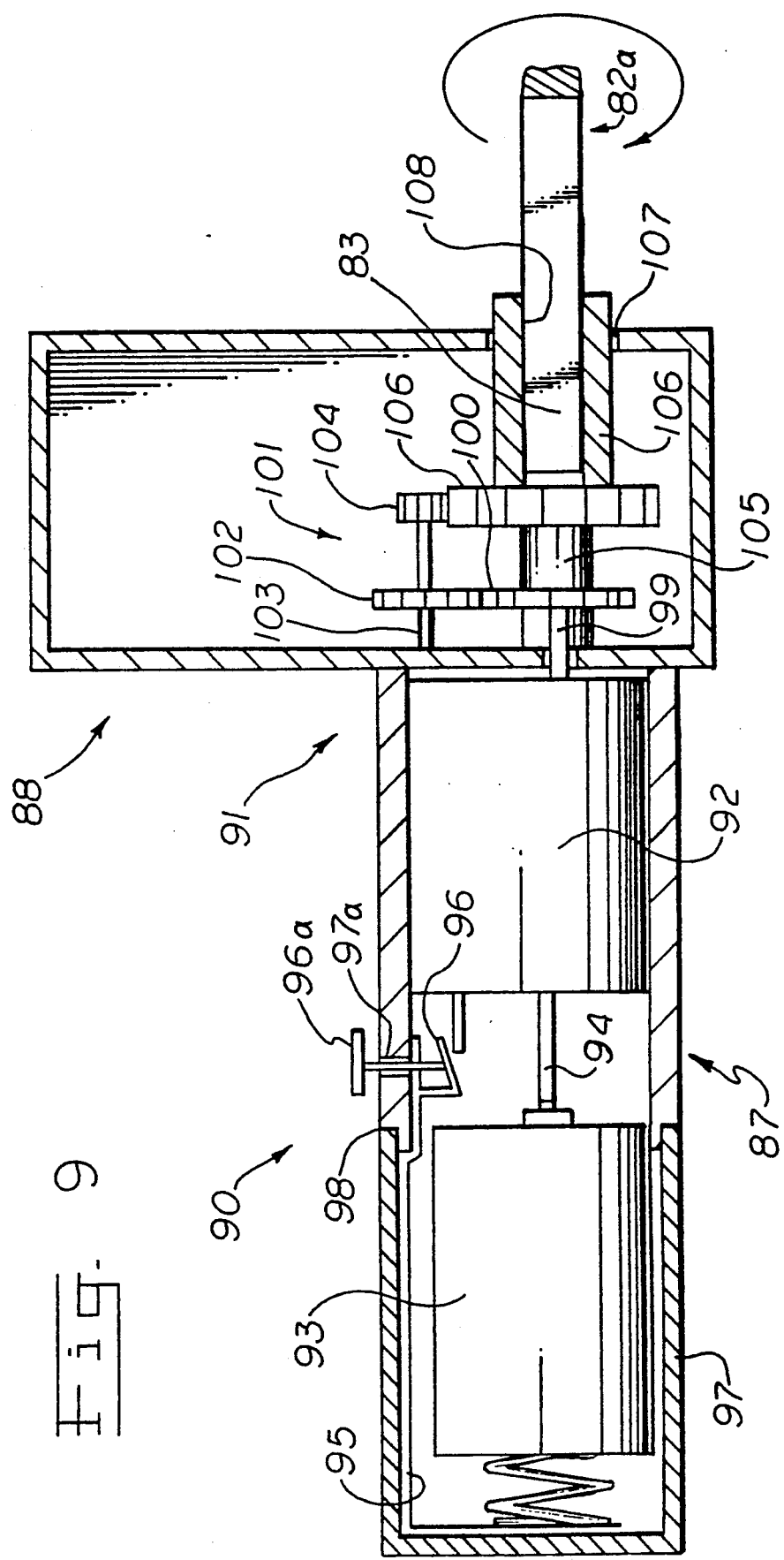

ROTARY FOOD COOKING DEVICE FOR A GRILL

BACKGROUND OF THE INVENTION

1. Field of the Invention

This invention relates to a cooking apparatus and more particularly to a new and novel self-supporting, free standing rotisserie cooking apparatus which is freely moveably mounted atop a barbeque grill or the like.

2. Description of the Prior Art and Objects

It is conventional to serve prepared pieces of food, such as meat and vegetables by mounting them on the length of a skewer blade. It is rather conventional to mount pieces of meat and vegetables such as tomatoes, mushrooms and peppers along the blades.

Sometimes, uncooked food is initially placed on the blades which are then manually placed above a heated grill and periodically manually rotated It frequently occurs that the skewered food which is cooked in this fashion is not evenly cooked because not all portions of the food are subjected to the same amount of heat from the heat source. Accordingly, it is an object of the present invention to provide new and novel skewered food cooking apparatus for rotatably driving food supporting skewers.

Skewered food cooking apparatus such as that disclosed in U.S. Pat. No. 4,154,154 issued to Weldon B. Vivian in May 15, 1979 and U.S. Pat. No. 3,442,202 issued to Taizo Ishida on May 6, 1969, have been provided heretofore, however, such apparatus is not free standing and freely supported on the grills but rather are clamped thereto. Substantial effort is required to mount such devices on a grill and thus fall into disfavor. Accordingly, it is another object of the present invention to provide skewered cooking apparatus of the type described which is self-supporting, freely moveable, and easily and quickly installed on and removed from a grill on which it is supported.

There is no uniformity between the sizes and shapes of barbeque grills. Accordingly, it is yet another object of the present invention to provide a portable skewer cooking apparatus of the type described which is adjustable in size to accommodate and fit on various sized cooking grills.

It is still another object of the present invention to provide skewer cooking apparatus of the type described which includes a box-like hollow frame that is adjustable and is freely supported by, and readily removeable from, a grill on which it is supported.

The U.S. Pat. No. 4,982,657 issued to George Ghenic on Jan. 8, 1991 discloses a hot dog roaster which cantileverly supports hot dogs above a grill via a plurality of laterally spaced, rotatably driven support elements. This construction, as does the construction illustrated in the aforementioned Vivian Patent, cantileverly supports the food supporting rods. The placement of many food items on an individual skewer presents a substantial mass which presents substantial bearing problems to the rotatable food support skewers. Accordingly, it is a still further object of the present invention to provide cooking apparatus of the type described which rotatably supports a plurality of rotatable skewers at opposite ends on an adjustable box like frame.

Motorized drive units have been provided for driving the terminal ends of skewer blades such as that disclosed in the aforementioned U.S. Pat. No. 3,442,202. Typically, the grill will be heated for a substantial time before and after the actual cooking of the food. Repeated heating and cooling of drive motors, which are mounted on the rear wall of the grill, can crystallize electrical components. Accordingly, it is another object of the present invention to provide a skewered cooking apparatus of the type described which will increase the life of a motorized drive unit utilized to rotate the skewer blades.

It is a further object of the present invention to provide skewered cooking apparatus of the type described including a motorized drive unit which is detachably mounted on a skewer rotatable mounted on a freely moveable grill supported frame.

A still further object of the present invention is to provide cooking apparatus of type described which mounts the drive motor, for rotating a plurality of food carrying, rotary, drivingly coupled skewer blades, on one of the skewer blades.

Other U.S. patents which disclose the state of the art as known to applicant at the time of the filing of this application are as follows:

| | | |
|---|---|---|
| 3,404,621 | Leach | Dec. 12, 1966 |
| 3,939,761 | McGinty | Feb. 24, 1976 |
| 3,866,527 | Katris | Feb. 18, 1975 |
| 3,848,523 | Galisz et al | Nov. 19, 1974 |
| 4,158,991 | Nakashima | Jun. 26, 1979 |
| 4,403,595 | Maesk | Sep. 13, 1983 |
| 4,760,776 | Beidler | Aug. 2, 1988 |

Other objects and advantages of the present invention will become apparent to those of ordinary skill in the art as the description thereof proceeds.

SUMMARY OF THE INVENTION

Cooking apparatus for rotatably supporting food to be cooked atop a cooking grill comprising: a self-supporting free standing frame for resting atop a grill and freely moveable relative thereto to any selected one of a plurality of different positions on the grill including: front and rear spaced apart frame members having opposite ends coupled by end frame members which are adjustable in length to adjust the positions of the front and rear frame members relative to each other in any selected one of a plurality of different positions; aligned openings are provided in the front and rear frame members for rotatably receiving a plurality of elongate skewer blades; a drive motor is mounted on one of the blades forwardly of the front frame member for rotating the one blade about its axis; and a plurality of intermeshing drive members are rotatably mounted on the rear frame member and are drivingly detachably coupled to the skewer blades for transmitting the rotary forces from the one blade to the other skewer.

DESCRIPTION OF THE DRAWINGS

The invention may be more readily understood by referring to the accompanying drawings, in which:

FIG. 2 is a side elevational view of one of the driven skewers illustrated in FIG. 1;

FIG. 3 is a rear elevational view of a skewer, taken along the line 3—3 of FIG. 2;

FIG. 4 is a front perspective view illustrating the front frame member only;

FIG. 5 is a slightly enlarged sectional side view taken along the line 5—5 of FIG. 6, more particularly illustrating one of the rive gears mounted on the rear wall;

FIG. 6 is a rear sectional view, taken along the line 6—6 of FIG. 5;

FIG. 7 is a rear elevational view taken along the line 7—7 of FIG. 5;

FIG. 8 is a side sectional view taken along the line 8—8 of FIG. 7; and

FIG. 9 is a greatly enlarged sectional side view taken along the line 9—9 of FIG. 1.

DESCRIPTION OF THE PREFERRED EMBODIMENT

Figure 1:
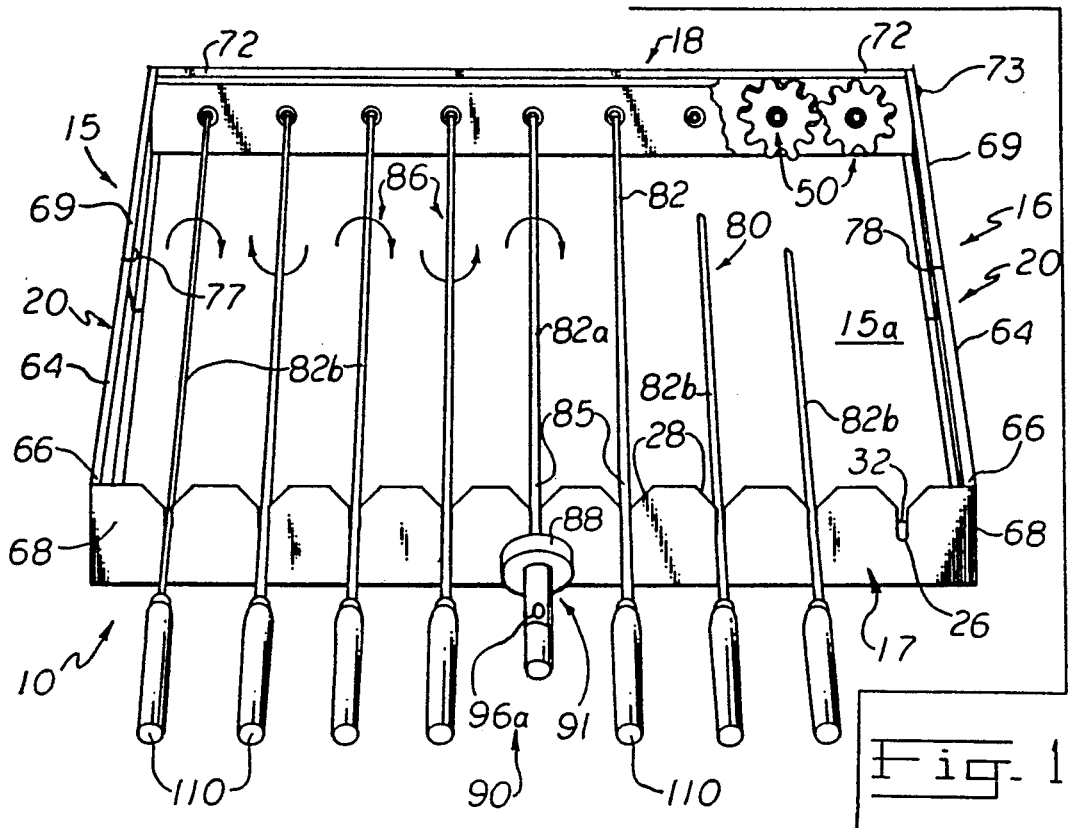
FIG. 1 is an exploded, front perspective view of apparatus constructed according to the present invention, parts of the rear frame member being broken away to more clearly illustrate the rotatable drive gears and part of the gridiron broken away to more clearly illustrate the underlying portion of the grill.
Figure 1:
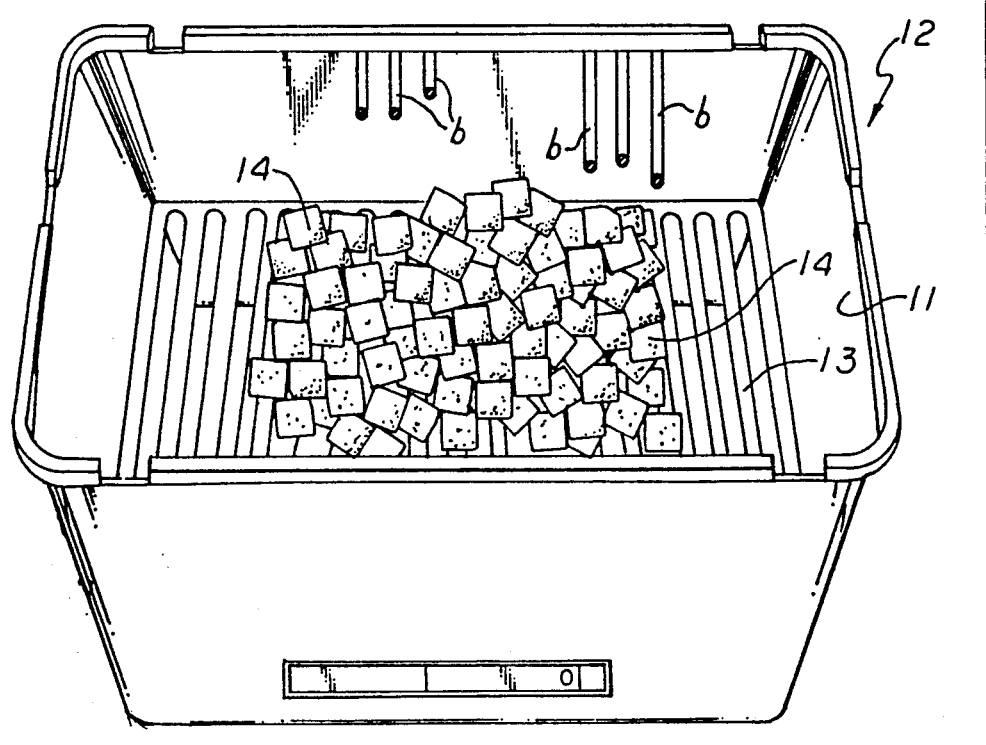

Apparatus constructed according to the present invention, generally designated 10, is particularly adapted for use with a barbeque grill, generally designated 12, which includes a hollow metal charcoal receiving, upwardly opening box 11 mounting a grate, generally designated 13, for supporting charcoal briquettes 14, as usual. A metal gridiron G having a plurality of laterally spaced food mounting bars b is supported on the box 11 as usual.

The cooking apparatus 10 is mounted on the gridiron G includes a hollow self-supporting, hollow, metal, rectangular frame, generally designated 16, having an upstanding perimeter wall, generally designated 15, surrounding a cooking opening 15a. The frame wall 15 includes a front frame member 17, rear frame member, generally designated 18, coupled at opposite ends via end frame members, generally designated 20. The front frame member 17 includes an upstanding sheet 22 of metal having a plurality of upwardly opening open ended slots 24 therein having semi-cylindrical lower ends 26 and projecting upwardly to upwardly outwardly diverging slot portions 28. The lower edge 30 of the sheet 22 rests on the upper surface 29 of the underlying gridiron bars b. An L-shaped reinforcing bar 32 is fixed to the inside 33 of the sheet 22 for providing increased strength.

The rear frame member 18 includes a spaced apart, vertical front and rear walls, generally designated 34 and 35, respectively, coupled by upper and lower walls 37 and 38, respectively, which terminate in a vertical flanges 40 and 41, respectively. The rear wall 35 is detachably fixed, via rivets or the like 44, to the flanges 40 and 41. The front and rear walls 34 and 35 include in-turn central, annular flanges 45 and 46, respectively, which define a plurality of openings 48 and 49 which are horizontally disposed at a level slightly below the level of the lower ends 26 of the slots 24 in the front plate 22.

The flanges 45 and 46 journal a plurality of laterally spaced apart gears, generally designated 50, each including a hub 52 which is journaled on the flanges 45 and 46 and a plurality of circumferentially spaced teeth 56 which mesh with the teeth 56 of an adjoining gear 50. The hub 52 includes a square shaped, central opening 58 therethrough. Forwardly of the squared opening 58 is a cup shaped guide surface 60 for a purpose to become more readily apparent hereinafter.

The squared openings 58 are horizontally aligned with the lower ends 26 of the slots 24 in the front frame member 17.

The side frame members 20 include front side sections 64 having forward ends 66 integrally coupled to the opposite ends 68 of the front frame plate 22. The side frame members 20 also include rear side sections 69 which have rear ends coupled to the opposite ends 72 of the rear frame member 19 via rivets 73. The rear side frame section are detachably coupled together via nuts 77 and bolts 78 received in apertures 74 and 76 provided in side frame sections 64 and 69 respectively.

A plurality of rotatable food skewers, generally designated 80, are provided and include a plurality of skewer blades, generally designated 82, which have longitudinal axes a and include forward terminal pointed ends 84 that pierce and penetrate food, schematically designated F, such as chunks of meat, vegetables, mushrooms, tomatoes and the like. The terminal positions 86 and the front handle mounting portions 83 of the blades 82 are square in cross section and are drivingly received by the complementally shaped, square apertures 52 of the interconnected gears 50. The remaining portions 85 of blades 80 are circular in cross-section and received in the semi-cylindrical lower end recesses 26 of the slots 24. The skewers 80 support the food F in the cooking opening 15a above the burning charcoal briquettes 14.

Drive apparatus, generally designated 90, is provided for driving the center-most skewer blade 82a and includes a housing, generally designated 91, mounting a DC motor 92 powered by a DC battery, generally designated 93, via electrical conductor 94 and 95 coupled to opposite ends of the battery 93, as usual. A switch 96 is coupled in circuit with line 94 and is manually opened and closed by a manually depressible actuator 96a which enters through an opening 97a in the housing 91 to selectively couple the battery 93 to the motor 92. The rear portion 97 of the casing is separated from the balance of the casing at 98 for access to the battery 93, if necessary. The housing 91, which may suitably comprise a plastic material, includes a hollow cylindrical motor and battery casing, generally designated 87, integrally coupled to a right circular hollow cylindrical gear casing 88. The motor and battery casing 87 includes a rear portion 89 which is detachable from the remaining portion 98 of casing 87 to provide access to the battery 93. The drive apparatus 90 is commercially available as a unit by Pechow International, Hong Kong, as model no. PI3606D.

The motor 92 includes an output shaft 99 mounting a gear 100 which is in intermeshing relation with a gear train, generally designated 101, mounted in gear housing 88. The gear train 101 includes a larger diameter gear 102 intermeshed with gear 100 and mounted on a rotatably mounted shaft 103 which, at its terminal end, mounts a smaller diameter gear 104. A still larger diameter output gear 106, which intermeshes with the gear 104, is mounted on a rotably mounted shaft 105, mounts a stub extension 106 which freely rotates in an opening 103 provided in casing 88 and has a square open shape ended opening 108 therein that receives the squared front terminal end portion 83 of the blade 82a.

The housing 91 serves as a hand grippable handle for lifting the center-most blade 82a upwardly out of the front frame slot 24 and thence pulling it outwardly of the gear 50 in which it is received.

A hand grippable handle 110 is mounted on each of the remaining blade 82b for manually inserting and removing the remaining blades 82b from the positions, illustrated in FIG. 1, received by the gears 50.

THE OPERATION

The rotisserie cooking apparatus 10 is mounted on the gridiron bars b of the barbeque grill 12 after the front and rear side frame portions 64 and 68 have been adjusted to properly adjust the distance between the front and rear frame members 17 and 18 to conform the size of the apparatus 10 to the size of the barbeque box 11 and the gridiron G. The user will raise the skewers 82a and 82b, via handles 110 and 91 respectively, and withdraw the squared terminal end skewer portions 86 from the squared openings 58 in the drive gears 50. The user then places the pointed skewer blade ends 84 through appropriate portions of food F to load the skewers. The skewer blades 82 are then returned to the positions illustrated in FIG. 1 where the squared ends 86 are received in the squared openings 84 and the circular cross section portions 85 are received in the semi-cylindrical recesses 26 in the forward frame plate 32.

The slot portions 28 at the upper edge of the front frame member 17 downwardly guides the handle end skewer portions and the cup shaped guide surface 60 guides the pointed skewer end 84 into the square, central gear opening 58.

The user will press the switch actuator 96a to complete the circuit from the battery 93 to the motor 92 to drive the center skewer blade 82a. This will force the gears 50 to rotate to force alternate skewer blades 82 to alternately rotate clockwisely and counter-clockwisely as illustrated by the arrows 112 and 114, respectively.

The entire apparatus 10 can be easily removed from the gridiron G by merely sliding it off the upper grill surface of the gridiron bars b.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. Cooking apparatus for mounting atop a cooking grill including:
    a self-supporting, free-standing frame for resting atop a grill for freely laterally moveable relative thereto;
    said frame including
        a front frame member;
        a rear frame member spaced apart from said front frame member;
        a pair of laterally spaced end frame members spanning the ends of said front and rear frame members;
        a plurality of laterally spaced apart openings provided in each of said front and rear frame members;
    a plurality of laterally spaced apart rotatable skewers, each having a longitudinal axis, adapted to support food to be cooked on said cooking grill and including
        elongate blades each having a longitudinal axis and being pointed at one end and
        hand grippable handles coupled to the opposite ends of said blades;
        said skewers spanning said front and rear frame members and being received by said openings for rotation therein about their longitudinal axes;
    drive means for rotating said skewers about their longitudinal axes including
        a plurality of intermeshing rotatable drive members mounted on said rear end frame member and drivingly coupled to portions of said blades adjacent said pointed ends; and
    motor means mounted on a portion of one of said skewer blades adjacent said front wall for rotating said one skewer blade about its longitudinal axis and rotatably driving said intermeshing rotatable drive members.

2. The cooking apparatus set forth in claim 1 wherein said end frame members each includes a pair of upstanding relatively moveable frame portions which are relatively adjustable to selectively adjust the distance between front and rear end frame members.

3. The cooking apparatus set forth in claim 1 wherein said rear frame member includes first and second upstanding walls having aligned openings therein;
    said intermeshing drive members being rotatably mounted on said first and second walls and having skewer blade receiving openings therein aligned with the openings in said walls and detachably receiving portions of said skewer blades adjacent said pointed ends.

4. The cooking apparatus set forth in claim 3 wherein said openings in said front frame member comprises a plurality of laterally spaced apart upwardly opening, open ended slots for receiving said portions of said skewer blades adjacent said handle.

5. The cooking apparatus set forth in claim 1 wherein said drive means includes a housing mounting one of said handles and an electrically energized drive motor received by said housing and drivingly coupled to said one skewer blade.

6. The cooking apparatus set forth in claim 5 wherein said rear frame member includes front and rear upstanding walls having a plurality of confronting in-turned flanges defining said openings which receive said skewers;
    said rotatable drive members including a plurality of gears having gear teeth which intermesh with the gear teeth of an adjacent gear and hubs which are journaled on said flanges and include openings which are drivingly coupled to portions of said skewer blades adjacent said pointed ends.

7. Cooking apparatus for rotatably supporting food to be cooked atop a cooking grill comprising:
    a self-supporting, free-standing frame for resting atop a grill and freely laterally moveable relative thereto;
    said frame including
        front and rear spaced apart frame members having opposite ends;
        laterally spaced apart end frame members spanning said opposite ends of said front and rear frame members,
        said front and rear frame members including aligned openings therethrough;
    a plurality of elongate skewer blades for mounting food spanning said front and rear end frame members and detachably received by said aligned openings for rotation about their respective longitudinal axes, each of said blades including a pointed end and an opposite end;
    drive means for rotating one of said skewer blades about its longitudinal axis including motor means coupled to said opposite end of said one skewer blade forwardly of said front frame member;

a handle mounted on said drive means for manually removing said drive means and said one skewer blade from said front and rear end frame members;

means for rotating the other of said skewer blades including
- a plurality of interconnected rotatable members rotatably mounted on said rear frame member and detachably, drivingly receiving portions of said skewer blades adjacent said pointed ends to rotate said other of said skewer blades when said drive means drives said one skewer blade.

8. The cooking apparatus set forth in claim 7 wherein said end frame members each includes first and second end frame portions; and means for detachably coupling said first and second end frame portions in any selected one of a plurality of different relative positions to adjust the relative positions of said front and back frame members.

9. The cooking apparatus set forth in claim 8 wherein said openings in said front frame member comprises a plurality of laterally spaced apart upwardly opening, open ended slots.

10. The cooking apparatus set forth in claim 9 wherein said interconnected rotatable drive members includes a plurality of intermeshing gears having gear teeth which intermesh with the gear teeth of adjacent gears and central hubs rotably journalled on said rear end frame member.

11. The cooking apparatus set forth in claim 10 wherein said rear frame member includes front and rear upstanding walls having inturned confronting flanges defining said openings in said rear frame member; said hubs being journalled on said flanges.

12. The cooking apparatus set forth in claim 11 wherein said upwardly opening slots each comprises a lower slot section having a predetermined width and an upper slot section which upwardly outwardly diverges and extends upwardly of said lower slot section.

13. Apparatus for cooking food on a cooking grill including:
- a free-standing, portable, self-supporting freely laterally moveable frame for resting on the grill including
  - a front frame member,
  - a rear frame member,
  - and a pair of end frame members coupling the ends of said front and rear frame members;
- said front frame member comprising an upstanding wall having a plurality of laterally spaced apart, upwardly opening, open ended slots;
- said rear frame member including
  - first and second, upstanding, spaced apart, parallel walls each having a plurality of laterally spaced apart openings therethrough aligned with the lower ends of said slots in said front frame member;
- a plurality of laterally spaced apart, rotatable skewers including elongate blades pointed at one end for penetrating and supporting food to be cooked on said cooking grill;
- said skewers being rotatable about their longitudinal axes and being rotatably received by said openings in said rear frame member and said lower ends of said slots in said front frame member;
- drive means for rotatably driving said skewers about their respective axes comprising;
  - a plurality of rotatable, interconnected drive members received between, and journalled for rotation on, said first and second upstanding walls and having apertures therein detachably slidably receiving portions of said skewer blades adjacent said pointed ends;
- said apertures each having a shape complemental to the cross-section of said portion of said skewer blade received thereby so as to be drivingly coupled thereto; and
- motor means coupled to one of said blades forwardly of said front frame member for rotating said blade about its longitudinal axis to rotatably drive said interconnected rive members and the other skewer blades.

14. The cooking apparatus set forth in claim 13 wherein said end frame members each include
- forward and rear upstanding frame portions each having one end fixed to one end of said front and rear frame members respectively and having a free ends;
- said free ends of said forward frame portions being disposed in abutting sliding relation with said free ends of said rearward frame portion;
- means for detachably coupling said free ends in any selected one of a plurality of different abutting positions to adjust the distance between said front and rear frame members.

15. The apparatus set forth in claim 14 wherein said apertures in said drive members include an outwardly flaring guide surface for guiding said pointed end of said skewer blades into said aperture.

* * * * *